(12) United States Patent
Nishi et al.

(10) Patent No.: US 12,411,386 B2
(45) Date of Patent: Sep. 9, 2025

(54) LIQUID CRYSTAL DISPLAY DEVICE

(71) Applicant: Sharp Display Technology Corporation, Kameyama (JP)

(72) Inventors: Shuji Nishi, Kameyama (JP); Keiichi Ina, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/791,409

(22) Filed: Jul. 31, 2024

(65) Prior Publication Data

US 2025/0085599 A1 Mar. 13, 2025

(30) Foreign Application Priority Data

Sep. 8, 2023 (JP) .................................. 2023-145981

(51) Int. Cl.
*G02F 1/1362* (2006.01)
*G02F 1/1333* (2006.01)
*G02F 1/1337* (2006.01)
*G02F 1/1368* (2006.01)

(52) U.S. Cl.
CPC .... *G02F 1/136286* (2013.01); *G02F 1/13338* (2013.01); *G02F 1/133738* (2021.01); *G02F 1/1368* (2013.01); *G02F 2203/02* (2013.01)

(58) Field of Classification Search
CPC ........... G02F 1/136286; G02F 1/13338; G02F 1/133738; G02F 1/1368; G02F 1/133555; G02F 1/133553; G02F 2203/02
See application file for complete search history.

(56) References Cited

U.S. PATENT DOCUMENTS

| | | | |
|---|---|---|---|
| 2012/0138922 A1 | 6/2012 | Yamazaki et al. | |
| 2013/0320334 A1 | 12/2013 | Yamazaki et al. | |
| 2014/0286076 A1 | 9/2014 | Aoki et al. | |
| 2022/0146874 A1* | 5/2022 | Yoshida | G06F 3/04164 |

FOREIGN PATENT DOCUMENTS

| | | |
|---|---|---|
| JP | 2000-122094 A | 4/2000 |
| JP | 3394926 B2 | 4/2003 |
| JP | 2003-131268 A | 5/2003 |
| JP | 2012-134475 A | 7/2012 |
| JP | 2014-007399 A | 1/2014 |
| JP | 2014-209727 A | 11/2014 |

* cited by examiner

*Primary Examiner* — Tracie Y Green
*Assistant Examiner* — Jose M Diaz
(74) *Attorney, Agent, or Firm* — ScienBiziP, P.C.

(57) ABSTRACT

A liquid crystal display device includes a first substrate, a second substrate, and a liquid crystal layer provided between the first substrate and the second substrate, and has pixels. Each pixel includes a reflective region in which to perform a display in a reflective mode. The first substrate includes a substrate, gate lines extending in a row-wise direction, source lines extending in a column-wise direction, thin-film transistors provided separately in correspondence with each pixel, pixel electrodes each electrically connected to a thin-film transistor, and a reflective layer provided between the pixel electrodes and the substrate. The first substrate further includes touch sensor electrodes and touch lines each electrically connected to a touch sensor electrode. The touch lines are formed from a conducting film that is identical to that from which the source lines are formed, and are provided between the reflective layer and the substrate.

11 Claims, 10 Drawing Sheets

LIQUID CRYSTAL DISPLAY DEVICE

BACKGROUND

1. Field

The present disclosure relates to a liquid crystal display device.

2. Description of the Related Art

Liquid crystal display devices are broadly divided into transmissive liquid crystal display devices and reflective liquid crystal display devices. A transmissive liquid crystal display device performs a transmissive mode of display with light emitted by a backlight. A reflective liquid crystal display device performs a reflective mode of display with ambient light. Further, there has been proposed a liquid crystal display device in which each pixel includes a reflective region in which to perform a display in a reflective mode and a transmissive region in which to perform a display in a transmissive mode. Such liquid crystal display device is called a "transflective or transmissive and reflective liquid crystal display device".

Reflective or transflective liquid crystal display devices are suitably used, for example, as small-and-medium-sized display devices for use in mobiles for outdoor use. A reflective liquid crystal display device is disclosed, for example, in Japanese Unexamined Patent Application Publication No. 2000-122094. A transflective liquid crystal display device is disclosed, for example, in Japanese Unexamined Patent Application Publication No. 2003-131268.

Liquid crystal display devices that are used in smartphones, tablets, or other devices are equipped with touch sensor functions. Known various types of touch sensor include resistive touch sensors, capacitive touch sensors, and optical touch sensors.

Liquid crystal display devices (hereinafter called "touch panels") provided with touch sensors are broadly divided into a type ("external type") of liquid crystal display device with a touch sensor externally attached thereto and a type ("built-in type") of liquid crystal display device with a touch sensor built therein. A built-in touch panel has an advantage over an external touch panel, for example, in terms of reductions in thickness and weight and has the advantage in its capability to increase light transmittance.

A built-in touch panel is of either an "on-cell type" or an "in-cell type". The term "cell" here refers to a display panel. The display panel includes an active matrix substrate (TFT substrate), a counter substrate placed opposite the TFT substrate, and a liquid crystal layer provided between the TFT substrate and the counter substrate. In the "in-cell type", a layer responsible for a touch sensor function is placed within the display panel. In the "on-cell type", a layer responsible for a touch sensor function is placed between the display panel and a polarizing plate provided on a side of the display panel that faces a viewer.

The in-cell type can achieve, in principal, the thinnest and lightest touch panel. Further, as already mentioned, a liquid crystal display device capable of a reflective mode of display is suitable for outdoor use. Therefore, there has been demand for an in-cell touch panel capable of a reflective mode of display, although such a touch panel is yet to be achieved.

It is desirable to provide a liquid crystal display device that is capable of a reflective mode of display and that can be suitably used as an in-cell touch panel.

SUMMARY

According to an aspect of the disclosure, there is provided a liquid crystal display device including a first substrate, a second substrate placed closer to a viewer than the first substrate, and a liquid crystal layer provided between the first substrate and the second substrate. The liquid crystal display device has a plurality of pixels arranged in a matrix including a plurality of rows and a plurality of columns. Each of the plurality of pixels includes a reflective region in which to perform a display in a reflective mode. The first substrate includes a substrate, a plurality of gate lines extending in a row-wise direction, a plurality of source lines extending in a column-wise direction, a plurality of thin-film transistors provided separately in correspondence with each of the plurality of pixels, a plurality of pixel electrodes each electrically connected to a corresponding one of the plurality of thin-film transistors, and a reflective layer formed from an electrical conducting material, located within at least the reflective region, and provided between the pixel electrodes and the substrate. The first substrate further includes a plurality of touch sensor electrodes to which different signals are applied and a plurality of touch lines each electrically connected to a corresponding one of the plurality of touch sensor electrodes. The plurality of touch lines are formed from a conducting film that is identical to that from which the plurality of source lines are formed, and are provided between the reflective layer and the substrate.

DESCRIPTION OF THE EMBODIMENTS

The following describes embodiments of the present disclosure with reference to the drawings. Embodiments of the present disclosure are not limited to those illustrated below.

Embodiment 1

Figure 1:
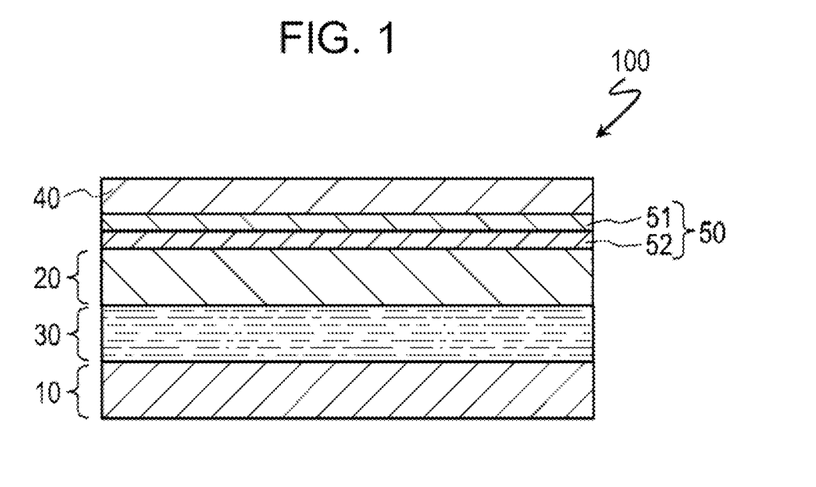
FIG. 1 is a cross-sectional view schematically showing a liquid crystal display device according to an embodiment of the present disclosure.
Figure 2:
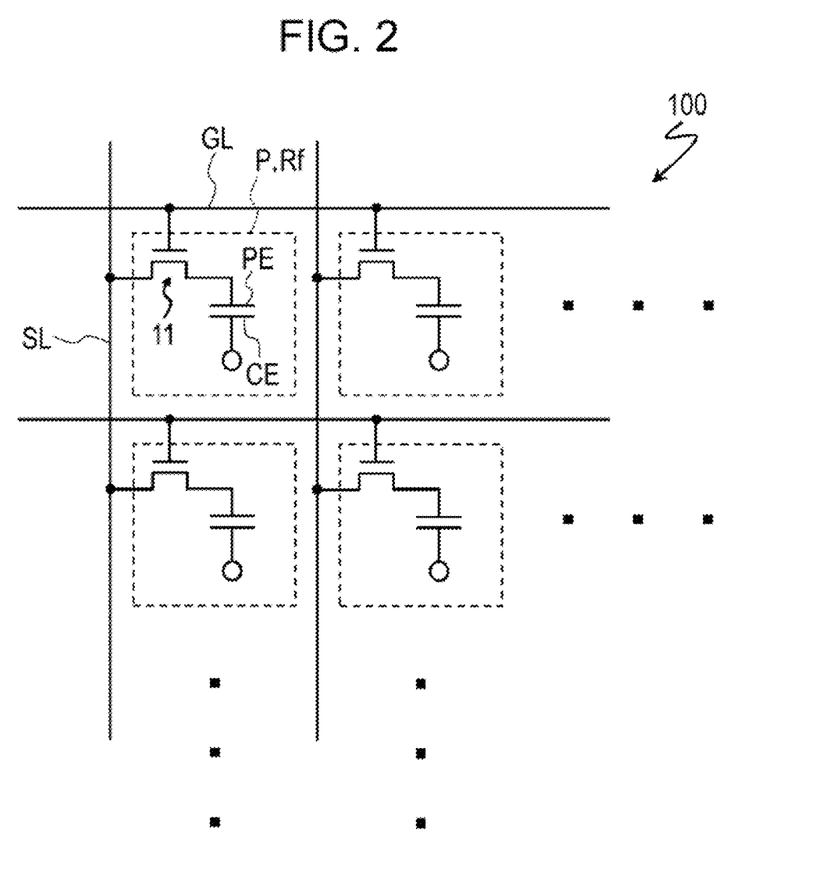
FIG. 2 is an equivalent circuit diagram of a plurality of pixels of the liquid crystal display device.

A liquid crystal display device 100 according to the present embodiment is described with reference to FIGS. 1 and 2. The liquid crystal display device 100 is a reflective liquid crystal display device that performs a display in a normally black mode. FIG. 1 is a cross-sectional view schematically showing the liquid crystal display device 100. FIG. 2 is an equivalent circuit diagram of a plurality of pixels P of the liquid crystal display device 100.

As shown in FIG. 1, the liquid crystal display device 100 includes an active matrix substrate (hereinafter called a "TFT substrate") 10, a counter substrate (hereinafter sometimes called a "color filter substrate") 20 placed closer to a viewer than the TFT substrate 10, and a liquid crystal layer 30 provided between the TFT substrate 10 and the counter substrate 20. The liquid crystal display device 100 further includes a polarizing plate 40 placed closer to the viewer than the liquid crystal layer 30 and a phase difference layer 50 placed between the polarizing plate 40 and the liquid crystal layer 30. In this embodiment, the polarizing plate 40 is placed closer to the viewer than the counter substrate 20, and the phase difference layer 50 is placed between the polarizing plate 40 and the counter substrate 20. Specifically, the polarizing plate 40 is an absorptive linear polarizing plate. In the illustrated example, the phase difference layer 50 includes a half-wavelength plate 51 and a quarter-wavelength plate 52.

Further, as shown in FIG. 2, the liquid crystal display device 100 has a plurality of pixels P. The plurality of pixels P are arranged in a matrix including a plurality of rows and a plurality of columns. Typically, the plurality of pixels P includes red pixels that display red, green pixels that display green, and blue pixels that display blue. As already mentioned, the liquid crystal display device 100 is a reflective liquid crystal display device. Therefore, each pixel P includes a reflective region Rf in which to perform a display in a reflective mode.

The TFT substrate 10 includes a plurality of gate lines (scanning lines) GL, a plurality of source lines (signal lines) SL, a plurality of thin-film transistors (TFTs) 11, a plurality of pixel electrodes PE, and a common electrode CE.

The plurality of gate lines GL extend in a row-wise direction. Each gate line GL supplies a corresponding TFT 11 with a gate signal (scanning signal). The plurality of source lines SL extend in a column-wise direction intersecting (e.g. orthogonal to) the row-wise direction. Each source line SL supplies a corresponding TFT 11 with a source signal (display signal).

The plurality of TFTs 11 are provided separately in correspondence with each pixel P. Each TFT 11 has its gate electrode electrically connected to a corresponding gate line GL and has its source electrode electrically connected to a corresponding source line SL. Each of the plurality of pixel electrodes PE is electrically connected to a corresponding TFT 11 (more specifically, to a drain electrode DE of the corresponding TFT 11).

The common electrode CE is provided to face the pixel electrodes PE across a dielectric layer 15 and can generate transverse electric fields (fringe electric fields) in the liquid crystal layer 30 together with the pixel electrodes PE. As will be described later, the common electrode CE is divided into a plurality of segments.

Figure 3:
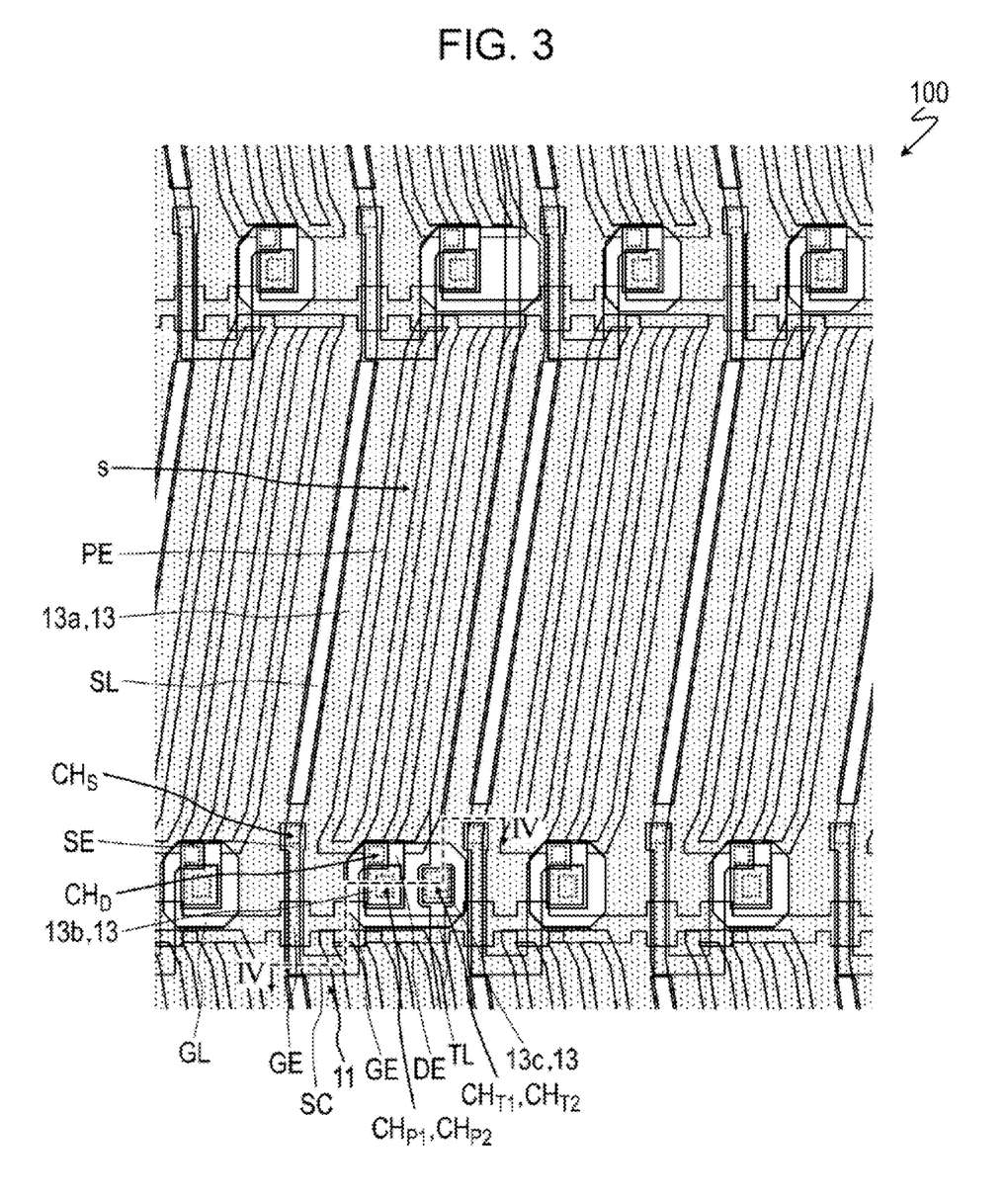
FIG. 3 is a plan view schematically showing the liquid crystal display device.
Figure 4:
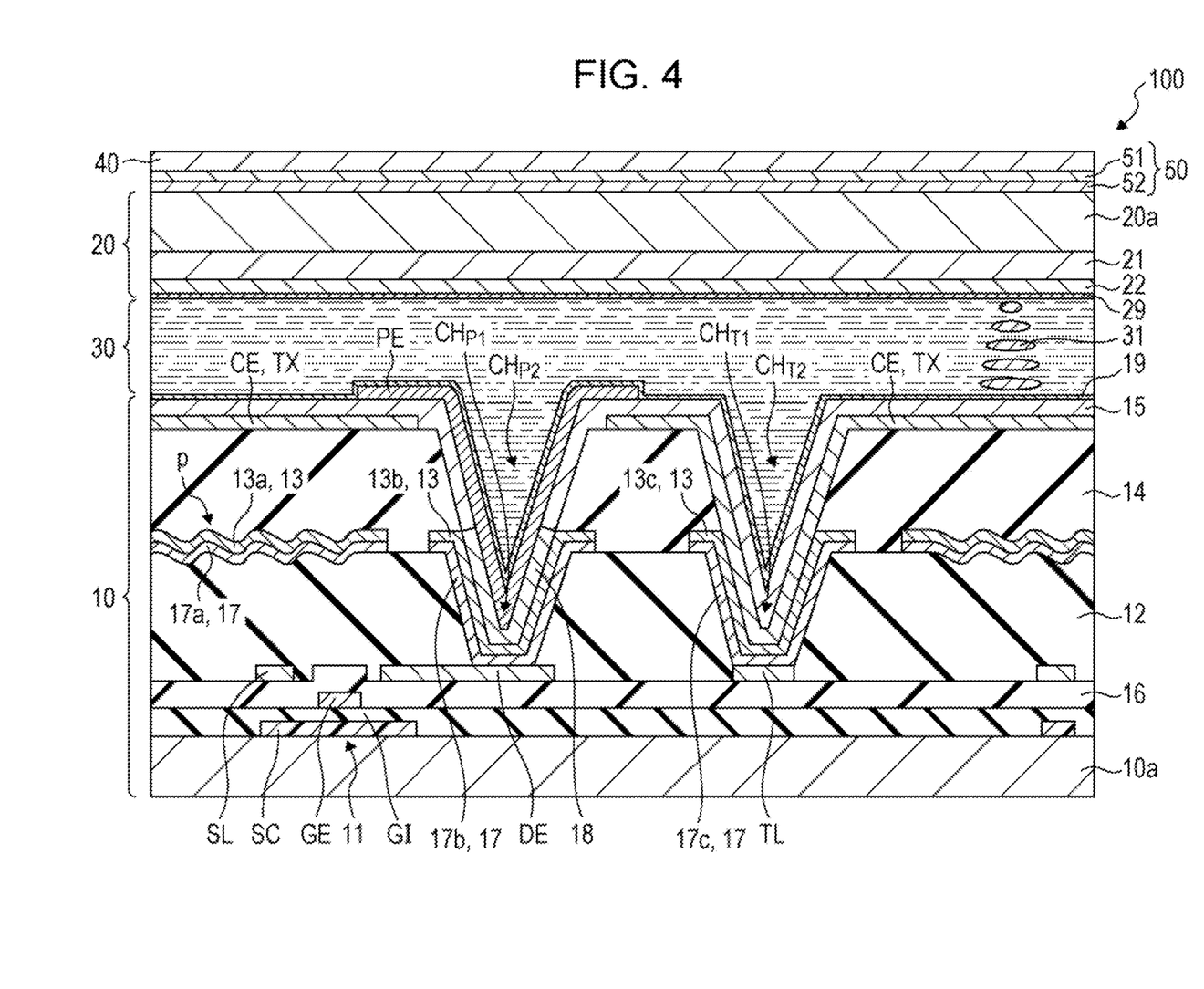
FIG. 4 is a cross-sectional view schematically showing the liquid crystal display device as taken along line IV-IV in FIG. 3.

Next, configurations of the TFT substrate 10 and the counter substrate 20 are more specifically described with reference to FIGS. 3 and 4. FIG. 3 is a plan view schematically showing the liquid crystal display device 100. FIG. 4 is a cross-sectional view schematically showing the liquid crystal display device 100 as taken along line IV-IV in FIG. 3.

The TFT substrate 10 includes a substrate 10a, the TFTs 11, a first interlayer insulating layer 12, and a reflective layer 13. Further, the TFT substrate 10 further includes a second interlayer insulating layer 14, the common electrode CE, the dielectric layer 15, the pixel electrodes PE, and a first horizontal alignment film 19.

The substrate 10a supports the TFTs 11 or other components. The substrate 10a is transparent and has insulation properties. The substrate 10a is, for example, a glass substrate or a plastic substrate.

The TFTs 11 are provided on top of the substrate 10a. The TFTs 11 are provided separately in correspondence with each of the plurality of pixels P. Each of the TFTs 11 includes a semiconductor layer SC, a gate insulating layer GI, a gate electrode GE, a source electrode SE, and a drain electrode DE. The gate electrode GE is electrically connected to a corresponding gate line GL, and the source electrode SE is electrically connected to a corresponding source line SL. The drain electrode DE is electrically connected to a pixel electrode PE. A circuit including the TFTs 11, the gate lines GL, the source lines SL, or other components for driving the plurality of pixels P is sometimes called a "backplane circuit".

The TFT 11 illustrated has a top-gate structure. The semiconductor layer SC is provided on top of the substrate 10a. The semiconductor layer SC here is a polycrystalline silicon layer (e.g. a low-temperature polysilicon (LTPS) layer).

The gate insulating layer GI is formed so as to cover the semiconductor layer SC, and the gate electrode GE is provided on top of the gate insulating layer GI. The gate electrode GE faces part (channel region) of the semiconductor layer SC across the gate insulating layer GI. In this embodiment, the gate electrode GE is formed integrally with the gate line GL.

A lower insulating layer 16 is formed so as to cover the gate electrode GE, and the source electrode SE and the drain electrode DE are provided on top of the lower insulating layer 16. The source electrode SE and the drain electrode DE are formed from the same conducting film as the source line SL (i.e. at the same layer as the source line SL). Further, in this embodiment, the source electrode SE is formed integrally with the source line SL. The source electrode SE is electrically connected to the semiconductor layer SC in a source contact hole $CH_S$ formed in the lower insulating layer 16 and the gate insulating layer GI. The drain electrode DE is electrically connected to the semiconductor layer SC in a drain contact hole $CH_D$ formed in the lower insulating layer 16 and the gate insulating layer GI.

The first interlayer insulating layer 12 is provided so as to cover the backplane circuit including the TFT 11. The first interlayer insulating layer 12 is a layer formed from an organic insulating material and, for example, can be formed with photosensitive resin.

The reflective layer 13 is provided on top of the first interlayer insulating layer 12 so as to be located within at least the reflective region Rf. That is, the reflective layer 13 is placed on top of the backplane circuit with the first interlayer insulating layer 12 sandwiched therebetween, and in other words, the first interlayer insulating layer 12 is provided between the reflective layer 13 and the TFT 11. Furthermore, in other words, the reflective layer 13 is adjacent to the TFT 11 across at least the first interlayer insulating layer 12.

The reflective layer 13 is formed from an electrical conducting material that reflects light. More specifically, the reflective layer 13 is formed from a high-reflectance metal material. The reflective layer 13 can be made of a material such as a silver alloy, aluminum, or an aluminum alloy.

In the illustrated example, the reflective layer 13 includes a first portion 13a, a second portion 13b, and a third portion 13c.

The first portion 13a of the reflective layer 13 occupies a large part of the reflective layer 13 and has asperities on a surface thereof. That is, the first portion 13a of the reflective layer 13 has an uneven surface structure. This uneven surface structure is sometimes called a "micro reflective structure (MRS)", and is provided to diffusely reflect ambient light to achieve a display that is close to paper white. The uneven surface structure can be constituted, for example, by a plurality of projections p randomly arranged so that a center-to-center spacing between adjacent projections p is larger than or equal to 5 μm and smaller than or equal to 50 μm or, preferably, larger than or equal to 10 μm and smaller than or equal to 20 μm. The projections p have substantially circular or polygonal shapes when seen from a direction normal to the substrate 10a. The projections p occupy an area of, for example, 20% to 40% of the pixels P. The projections p have a height, for example, greater than or equal to 1 μm and less than or equal to 5 μm.

Any method can be employed to form an uneven surface structure in at least part of the reflective layer 13. For example, as illustrated, by forming a first interlayer insulating layer 12 having an uneven surface structure and forming a reflective layer 13 on top of the first interlayer insulating layer 12, an uneven shape reflecting the uneven surface structure of the first interlayer insulating layer 12 can be imparted to a surface of at least part of the reflective layer 13. A first interlayer insulating layer 12 having an uneven surface structure can be formed, for example, by a method disclosed in Japanese Patent No. 3394926.

As will be described later, the second portion 13b of the reflective layer 13 functions as a "first contact electrode" for electrically connecting the drain electrode DE of the TFT 11 and the pixel electrode PE. Further, the third portion 13c of the reflective layer 13 functions as a "second contact electrode" for electrically connecting a touch line TL and a touch sensor electrode TX that will be described later. The first portion 13a, second portion (first contact electrode) 13b, and third portion (second contact electrode) 13c of the reflective layer 13 are electrically separated from one another.

In the illustrated example, a transparent conductive layer 17 is sandwiched between the reflective layer 13 and the first interlayer insulating layer 12. Usable examples of transparent conductive materials for forming the transparent conductive layer 17 include indium tin oxide (ITO), indium zinc oxide (IZO (registered trademark)), and a mixture thereof. Portions 17a, 17b, and 17c of the transparent conductive layer 17 located immediately below the first portion 13a, second portion 13b, and third portion 13c of the reflective layer 13 are called a "first portion", a "second portion", and a "third portion", respectively, of the transparent conductive layer 17. The transparent conductive layer 17 may be omitted.

The second interlayer insulating layer 14 is provided on top of the first interlayer insulating layer 12 so as to cover the reflective layer 13. Accordingly, it can be said that the reflective layer 13 is provided between the first interlayer insulating layer 12 and the second interlayer insulating layer 14. The second interlayer insulating layer 14 is a planarizing layer formed from an organic insulating material and, for example, can be formed with photosensitive resin.

The common electrode CE is provided on top of the second interlayer insulating layer 14. The common electrode CE is formed from a transparent conductive material. The common electrode CE can be formed of a transparent conductive material that is similar to the material of the transparent conductive layer 17.

The dielectric layer 15 is provided so as to cover the common electrode CE. The dielectric layer 15 can be formed, for example, from an inorganic insulating material.

The pixel electrodes PE are provided separately in each of the plurality of pixels P. Further, the pixel electrodes PE are provided on top of the dielectric layer 15. Accordingly, it can be said that the second interlayer insulating layer 14 is provided between the pixel electrodes PE and the reflective layer 13. Further, it can be said that the reflective layer 13 is adjacent to the pixel electrodes PE across at least the second interlayer insulating layer 14 and is located opposite the liquid crystal layer 30 behind the pixel electrodes PE (i.e. between the pixel electrodes PE and the substrate 10a).

The pixel electrodes PE are formed from a transparent conductive material. The pixel electrodes PE can be formed of a transparent conductive material that is similar to the material of the transparent conductive layer 17. Each of the pixel electrodes PE is electrically connected to a corresponding one of the TFTs 11.

In the illustrated example, the pixel electrode PE is electrically connected to the drain electrode DE of the TFT 11 via the first contact electrode 13b. The first interlayer insulating layer 12 has formed therein a first pixel contact hole $CH_{P1}$ through which at least part of the drain electrode DE of the TFT 11 is exposed, and the first contact electrode 13b is electrically connected to the drain electrode DE of the TFT 11 in the first pixel contact hole $CH_{P1}$. In this embodiment, the second portion 17b of the transparent conductive layer 17 is sandwiched between the first contact electrode 13b and the drain electrode DE. Further, the second interlayer insulating layer 14 has formed therein a second pixel contact hole $CH_{P2}$ through which part of the first contact electrode 13b is exposed, and the pixel electrode PE is electrically connected to the first contact electrode 13b in the second pixel contact hole $CH_{P2}$. In this embodiment, a third contact electrode 18 formed from the same transparent conductive film as the common electrode CE is sandwiched between the pixel electrode PE and the first contact electrode 13b. The third contact electrode 18 may be omitted.

The pixel electrode PE has at least one (in this embodiment, a plurality of) slit s. The formation of a slit s in the pixel electrode PE causes a potential difference between the pixel electrode PE and the common electrode CE, generating a fringe electric field (transverse electric field) in the liquid crystal layer 30.

The first horizontal alignment film 19 is provided on top of the pixel electrode PE and the dielectric layer 15 and is in contact with the liquid crystal layer 30. Accordingly, it can be said that the pixel electrode PE and the common electrode CE are provided between the second interlayer insulating layer 14 and the first horizontal alignment film 19. Further, it can also be said that the dielectric layer 15 is provided between the second interlayer insulating layer 14 and the first horizontal alignment film 19, and in this embodiment, the common electrode CE is provided between the second interlayer insulating layer 14 and the dielectric layer 15, and the pixel electrode PE is provided between the dielectric layer 15 and the first horizontal alignment film 19.

The counter substrate 20 includes a substrate 20a, a color filter layer 21, an overcoat layer 22, and a second horizontal alignment film 29. Further, although not illustrated here, the counter substrate 20 further includes a plurality of columnar spacers.

The substrate 20a supports the color filter layer 21 or other components. The substrate 20a is transparent and has insulation properties. The substrate 20a is, for example, a glass substrate or a plastic substrate.

Typically, the color filter layer 21 includes red color filters provided in regions that correspond to the red pixels, green color filters provided in regions that correspond to the green pixels, and blue color filters provided in regions that correspond to the blue pixels. The red color filters, the green color filters, and the blue color filters transmit red light, green light, and blue light, respectively. In a case where a color display is not performed, the color filter layer 21 is omitted.

The overcoat layer (planarizing layer) 22 is provided so as to cover the color filter layer 21. A white display may have a yellowish tint depending on the transparent conductive material used (for the transparent conductive layer 17, the pixel electrodes PE, and the common electrode CE), the organic insulating material used (for the first interlayer insulating layer 12 and the second interlayer insulating layer 14), the inorganic insulating material used (for the dielectric layer 15), and the alignment film material used (for the first horizontal alignment film 19 and the second horizontal alignment film 29). In that case, the chromaticity of the white display may be brought close to the chromaticity of, for example, a D65 light source by making a chromaticity adjustment (blue shift) by forming the overcoat layer 22 with a blue resist.

The columnar spacers define the thickness (cell gap) of the liquid crystal layer 30. The columnar spacers can be formed from photosensitive resin.

The second horizontal alignment film 29 is provided on top of the overcoat layer 22 and is in contact with the liquid crystal layer 30.

The liquid crystal layer 30 contains a nematic liquid crystal material that is positive (i.e. of a positive type) in dielectric anisotropy $\Delta\varepsilon$ or a nematic liquid crystal material that is positive (i.e. of a positive type) in dielectric anisotropy $\Delta\varepsilon$. The dielectric anisotropy $\Delta\varepsilon$ is a difference between a dielectric constant $\varepsilon_{//}$ of a liquid crystal molecule 31 in a long axis direction and a dielectric constant $\varepsilon_\perp$ of the liquid crystal molecule 31 in a short axis direction (i.e. $\varepsilon_{//}-\varepsilon_\perp$). The liquid crystal layer 30 may further contain a chiral agent. The liquid crystal layer 30 can be formed, for example, by a falling-drop method. The thickness of the liquid crystal layer 30 is not limited to particular values.

Each of the first and second horizontal alignment films 19 and 29 is subjected to an alignment process and defines the orientation of liquid crystal molecules 31 contained in the liquid crystal layer 30. The orientation defined by the first horizontal alignment film 19 and the orientation defined by the second horizontal alignment film 29 are different from each other.

Since the first horizontal alignment film 19 and the second horizontal alignment film 29 are provided on both sides, respectively, of the liquid crystal layer 30, the liquid crystal molecules 31 of the liquid crystal layer 30 are horizontally aligned (that is, at a pretilt angle of substantially 0 degree) in the absence of the application of a voltage to at least the liquid crystal layer 30. As already mentioned, the orientation defined by the first horizontal alignment film 19 and the orientation defined by the second horizontal alignment film 29 are different from each other. Therefore, as shown in FIG. 4, the liquid crystal layer 30 assumes twist alignment when no voltage is applied. When a voltage is applied to the liquid crystal layer 30, i.e. when transverse electric fields (fringe electric fields) are generated in the liquid crystal layer 30 by the pixel electrodes PE and the common electrode CE, the transverse electric fields cause a change in the alignment of the liquid crystal layer 30.

In the liquid crystal display device 100 of the present embodiment, the common electrode CE is divided into a plurality of segments TX. Since different signals (voltages) can be applied to the plurality of segments TX, the plurality of segments TX can function as "touch sensor electrodes" in an in-cell touch panel. That is, the TFT substrate 10 of the liquid crystal display device 100 includes a plurality of touch sensor electrodes TX. Each touch sensor electrodes TX is provided in correspondence with two or more pixels P.

Further, the TFT substrate 10 further includes a plurality of touch lines TL. Each of the plurality of touch lines TL is electrically connected to a corresponding one of the plurality of touch sensor electrodes TX. The plurality of touch lines TL extend in the column-wise direction (i.e. in the same direction as the source lines SL), and each touch line TL is placed between source lines SL that are adjacent to each other. Further, the plurality of touch lines TL are formed from the same conducting film as the plurality of source lines SL (i.e. at the same layer as the plurality of source lines SL). Therefore, the plurality of touch lines TL are covered by the first interlayer insulating layer 12 and located between the reflective layer 13 and the substrate 10a.

In the illustrated example, each touch line TL and a corresponding touch sensor electrode TC are electrically connected to each other via the second contact electrode 13c. The first interlayer insulating layer 12 has formed therein a first touch contact hole $CH_{T1}$ through which part of the touch line TL is exposed, and the second contact electrode 13c is electrically connected to the touch line TL in the first touch contact hole $CH_{T1}$. In this embodiment, the third portion 17c of the transparent conductive layer 17 is sandwiched between the second contact electrode 13c and the touch line TL. Further, the second interlayer insulating layer 14 has formed therein a second touch contact hole $CH_{T2}$ through which part of the second contact electrode 13c is exposed, and the touch sensor electrode TX is electrically connected to the second contact electrode 13c in the second touch contact hole $CH_{T2}$.

Figure 5:
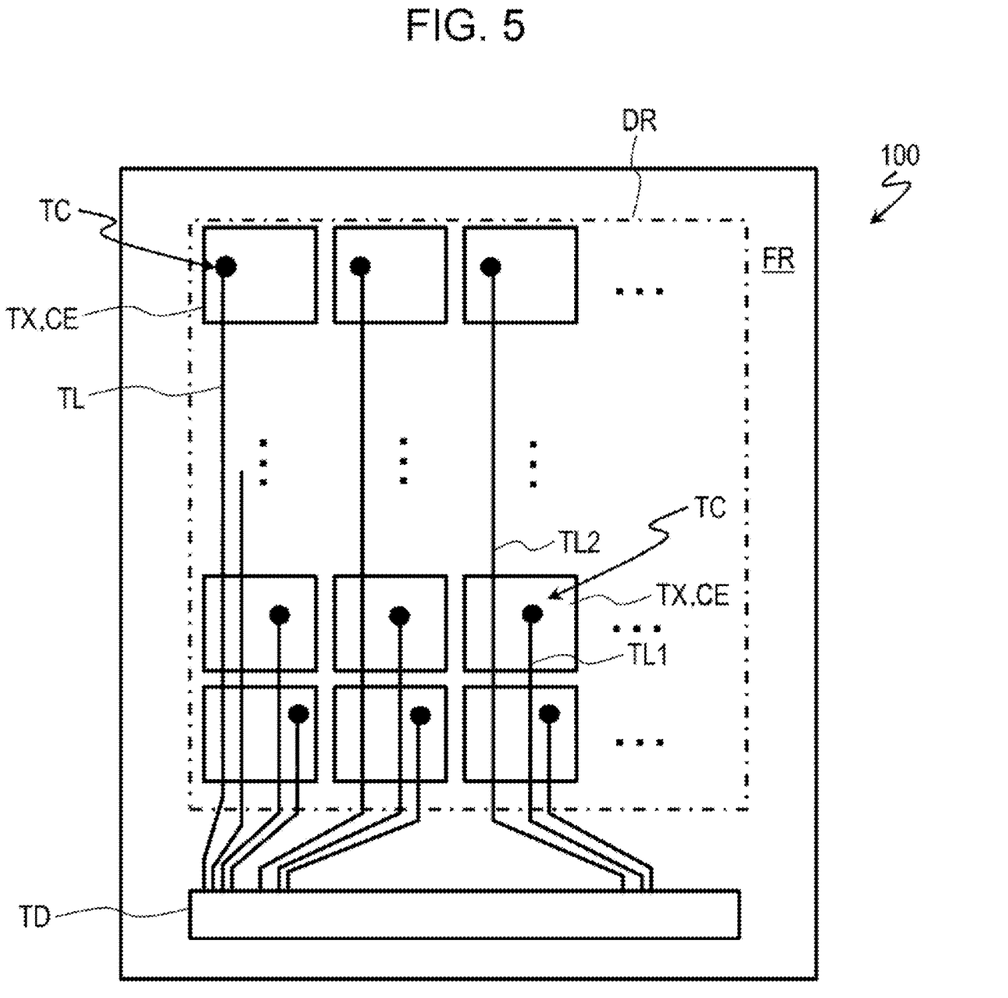
FIG. 5 is a plan view illustrating a positional relationship between touch sensor electrodes and touch lines in the liquid crystal display device.

FIG. 5 is a plan view illustrating a positional relationship between the touch sensor electrodes TX and the touch lines TL. As shown in FIG. 5, the liquid crystal display device 100 has a display region DR and a non-display region FR. The display region DR is defined by the matrix arrangement of pixels P (see FIG. 2). The non-display region FR is located around the display region DR and sometimes called a "peripheral region" or a "frame region".

In the display region DR, the common electrode CE is divided into the plurality of segments (touch sensor electrodes) TX. Each touch sensor electrode TX is electrically connected to a corresponding touch line TL. A connection TC between the touch sensor electrode TX and the touch line TL is called a "touch line contact".

The touch lines TL are connected to a touch drive unit TD provided in the non-display region FR. The touch drive unit TD is configured to switch in a time-sharing manner, for example, between a display mode in which the plurality of touch sensor electrodes TX function as the common electrode CE and a touch detection mode in which the plurality of touch sensor electrodes TX function as touch sensor electrodes TX. For example, in the display mode, the touch drive unit TD applies a common signal to the touch sensor electrodes TX (common electrode CE) via the touch lines TL. On the other hand, in the touch detection mode, the touch drive unit TD applies touch driving signals to the touch sensor electrodes TX via the touch lines TL.

To the first portion 13a (portion having an uneven surface structure) of the reflective layer 13, a common signal (common voltage) that is different from the common signal that is applied to the touch sensor electrodes TX can be inputted from the non-display region FR. Note, however, that such an aspect is not intended to impose any limitation, but any voltage can be applied to the first portion 13a of the reflective layer 13. Further, the first portion 13a of the reflective layer 13 may, for example, be electrically floating.

The plurality of touch lines TL extend in the column-wise direction (i.e. in the same direction as the source lines SL). Some touch lines TL each extend across another one or more touch sensor electrodes TX to a corresponding touch sensor electrode TX.

With a focus on a certain touch sensor electrode TX, a first touch line TL1 that supplies a signal to the touch sensor electrode TX extends to the touch line contact TC, and a second touch line TL2 for supplying a signal to another touch sensor electrode TX extends across the touch sensor electrode TX. Depending on the position of a touch sensor electrode TX, two touch lines TL may be placed so as to extend across the touch sensor electrode TX, or no touch line TL may be placed across the touch sensor electrode TX.

Although not illustrated, in the non-display region FR, peripheral circuits including driving circuits such as a gate driver that supplies gate signals to the gate lines GL and a source driver that supplies source signals to the source lines SL are provided in addition to the touch drive unit TD. These driving circuits may be mounted, for example, in the TFT substrate 10 or may be integrally (monolithically) formed. In the non-display region FR, a semiconductor chip including some or all of the driving circuits may be mounted.

As mentioned above, in the liquid crystal display device 100 of the present embodiment, the touch lines TL are formed from the same conducting film as the source lines SL (i.e. at the same layer as the source lines SL) and provided between the reflective layer 13 and the substrate 10a (i.e. opposite the liquid crystal layer 30 behind the reflective layer 13). This makes it possible to achieve simpler manufacturing processes and lower manufacturing costs than in a case where a configuration of a conventional in-cell touch panel is simply applied to a reflective liquid crystal display device. The following explains why such advantages are brought.

Figure 6:
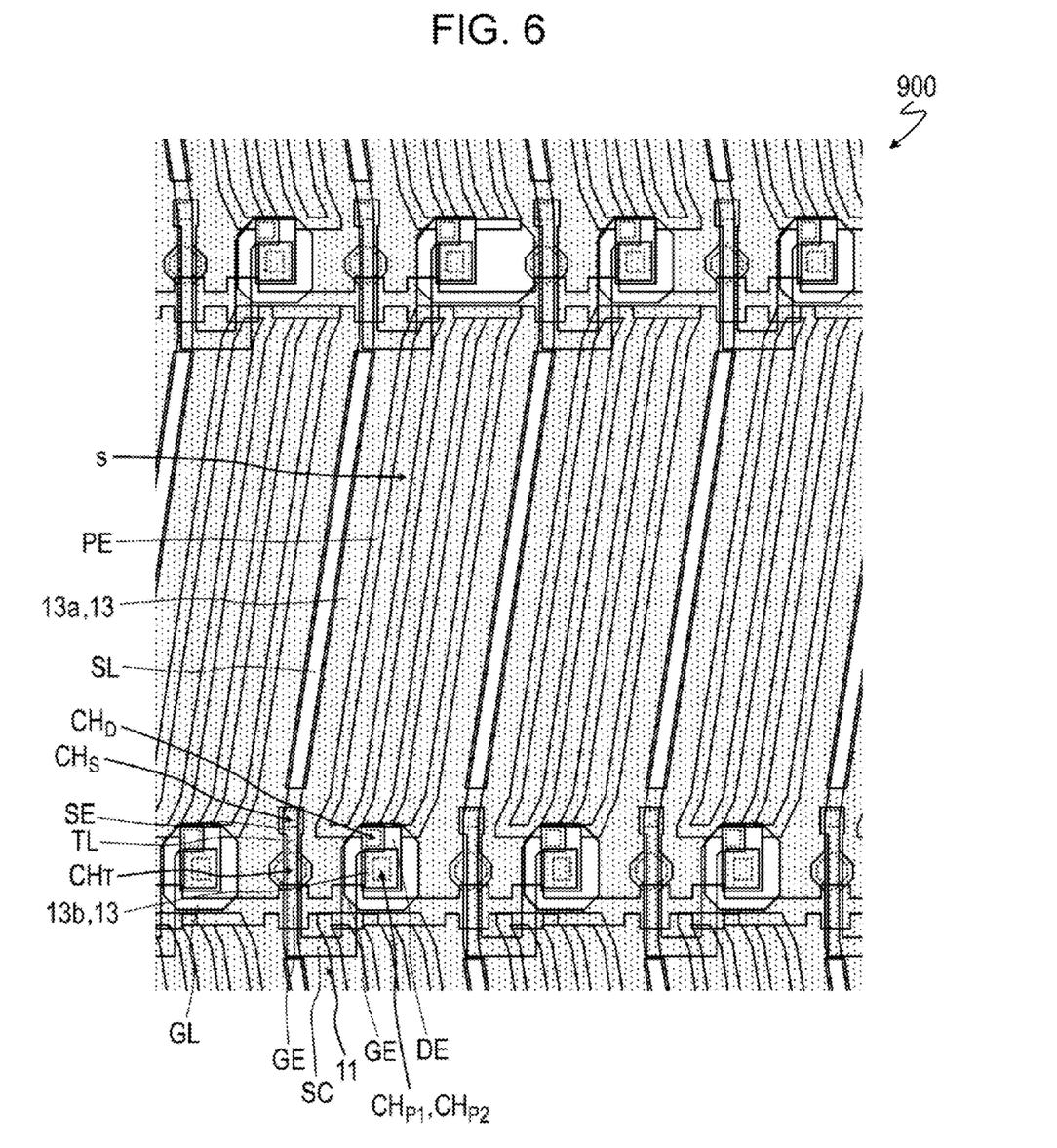
FIG. 6 is a plan view schematically showing a liquid crystal display device of a comparative example.
Figure 7:
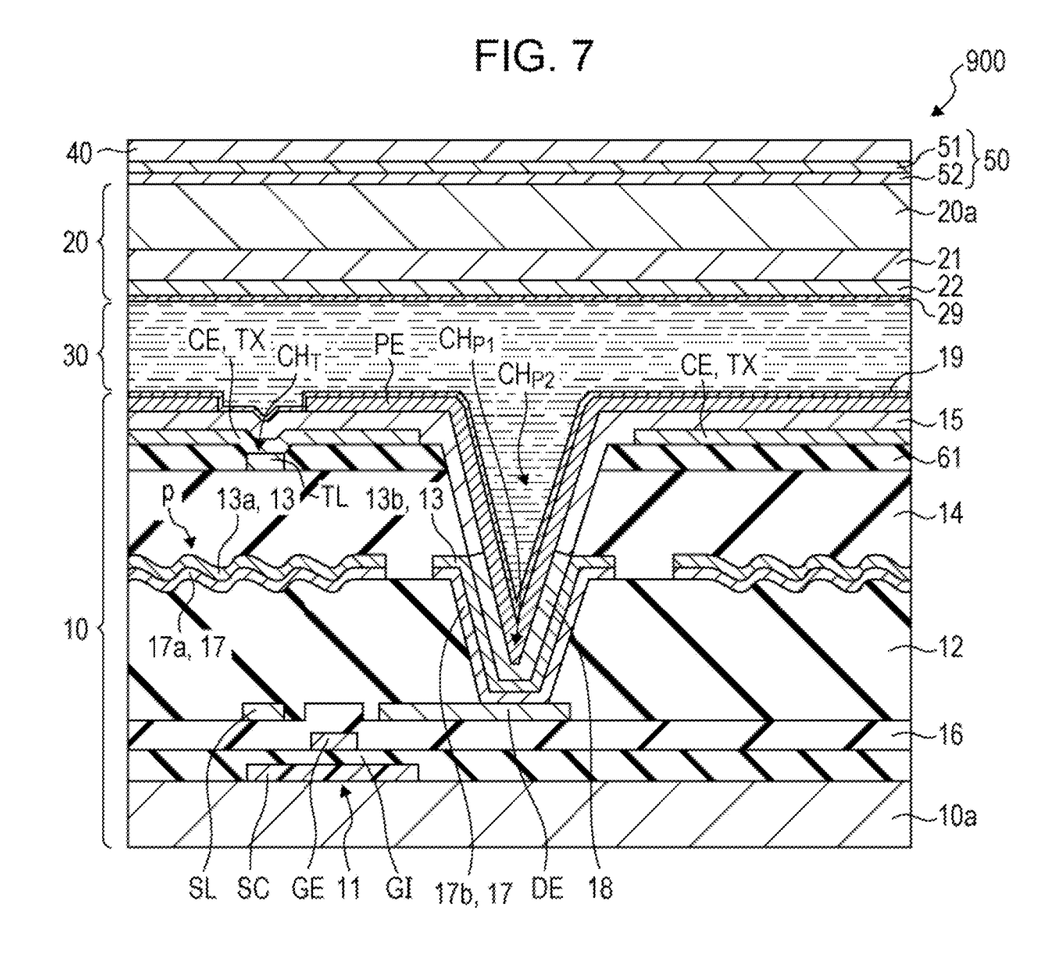
FIG. 7 is a cross-sectional view schematically showing the liquid crystal display device.

FIGS. 6 and 7 are a plan view and a cross-sectional view schematically showing a liquid crystal display device 900 of a comparative example. The liquid crystal display device 900 of the comparative example can be said to be one obtained by simply applying a configuration of a conventional in-cell touch panel to a reflective liquid crystal display device.

The liquid crystal display device 900 of the comparative example differs from the liquid crystal display device 100 in that the touch lines TL are formed from a conducting film that is different from that from which the source lines SL are formed (i.e. at a layer that is different from that at which the source lines SL are formed). In the liquid crystal display device 900, the touch lines TL are provided on top of a second insulating layer 14, and an upper insulating layer 61 is formed so as to cover the touch lines TL. The upper insulating layer 61 can be an organic insulating layer formed from photosensitive resin or an inorganic insulating layer formed from silicon nitride (SiNx). The upper insulating layer 61 has formed therein a touch contact hole $CH_T$ through which part of a touch line TL is exposed, and the touch line TL and a touch sensor electrode TX located on top of the upper insulating layer 61 are electrically connected to each other in the touch contact hole $CH_T$. The touch lines TL are located between the reflective layer 13 and the liquid crystal layer 30 (i.e. closer to the liquid crystal layer 30 than the reflective layer 13). Further, the touch lines TL overlap the source lines SL in a plan view.

In a case where the liquid crystal display device 900 of the comparative example is manufactured, there is a need to add a step of depositing and patterning a new conducting film for forming the touch lines TL, a step of depositing and patterning a new insulating layer (upper insulating layer 61) that covers the touch lines TL, or other steps. This results in more manufacturing processes and higher manufacturing costs.

On the other hand, in manufacturing the liquid crystal display device 100 of the present embodiment, in which the touch lines Tl are formed from the same conducting film as the source lines SL (i.e. at the same layer as the source lines SL), there is no need to add a step of depositing and patterning a new conducting film for forming the touch lines TL, a step of depositing and patterning a new insulating layer that covers the touch lines TL, or other steps. This makes it possible to achieve simpler manufacturing processes and lower manufacturing costs than does the liquid crystal display device 900 of the comparative example.

Further, in the liquid crystal display device 100 of the present embodiment, in which the touch lines TL are provided between the reflective layer 13 and the substrate 10a (i.e. opposite the liquid crystal layer 30 behind the reflective layer 13), there are only slight decreases in reflection aperture ratio and reflectance due to the touch lines TL. In an in-cell touch panel using a transmissive liquid crystal display device, forming touch lines from the same conducting film as source lines is considered to make it possible to achieve simpler manufacturing processes and lower manufacturing costs. However, in that case, regions in which the touch lines are provided are not usable for a transmissive display, as the touch lines are not able to be placed over the source lines. This results in a decrease in transmittance, i.e. a decrease in optical performance. On the other hand, in the liquid crystal display device 100 of the present embodiment, in which the touch lines TL are located between the reflective layer 13 and the substrate 10a, there are almost no decreases in reflection aperture ratio and reflectance, and it can therefore be said that there is almost no such decrease in optical performance as that mentioned above.

While the foregoing description has illustrated a configuration in which the pixel electrodes PE are provided above the common electrode CE, the common electrode CE may be provided above the pixel electrodes PE. In the following, of each of the pixel electrodes PE and the common electrode CE, an electrode located relatively above is sometimes called an "upper electrode", and an electrode located relatively below is called a "lower electrode". The upper electrode and the lower electrode are adjacent to each other across the dielectric layer 15. To generate a transverse electric field, at least the upper electrode includes at least one slit in each pixel P.

In a liquid crystal display device of a comparatively large size (i.e. in which the pixels P are comparatively large in area), it is preferable that the pixel electrodes PE be provided above the common electrode CE. In the configuration in which the pixel electrodes PE are provided above the common electrode CE, there is no need to form a slit in the common electrode CE. This further suppresses a rise in resistivity (surface resistivity) of the common electrode CE than in a configuration in which the common electrode CE is provided above the pixel electrodes CE. A rise in resistivity of the common electrode CE results in a decrease in speed of supply of electric charge to the common electrode CE, increasing the likelihood of failure (such as flicker or shadow) in display of an image (such as a checkered pattern, a stripe pattern, or an image whose display is partly composed of these patterns, with imbalances in the polarity of pixel) that needs a large amount of electric charge to be supplied to the common electrode CE.

In the configuration in which the pixel electrodes PE are provided above the common electrode CE, there is a need to form a slit in each of the pixel electrodes PE. This causes a rise in resistivity of each of the pixel electrodes PE. However, the area of each of the pixel electrodes PE is sufficiently smaller than (e.g. smaller than or equal to one-millionth) the area of the common electrode CE. Therefore, the pixel electrodes PE are to be supplied with smaller amounts of electric charge and are supplied with electric charge from the TFTs 11 connected on a pixel-by-pixel basis. This reduces susceptibility to a display image and also reduces the likelihood of display defects.

In the configuration in which the pixel electrodes PE are provided above the common electrode CE, slits for generating fringe electric fields are not able to be provided in the pixel electrodes PE in regions in which pixel contact holes are formed, and furthermore, there is a need to provide openings in the common electrode CE in those regions. Therefore, effective fringe electric fields are not generated in those regions, and those regions no longer contribute to a reflection display. This can result in lower reflectance than in the configuration in which the common electrode CE is provided above the pixel electrodes PE. Regardless of whether the pixels P are large or small in area, there is a need for a certain area of regions such as contact holes that do not contribute to a reflection display. Therefore, the proportion of regions in the pixels P that do not contribute to a reflection display becomes higher as the pixels P become smaller in area (i.e. become higher in definition), and the aforementioned decrease in reflectance becomes greater. On the other hand, in a liquid crystal display device of a comparatively large size, the proportion of regions in the pixels P that do not contribute to a reflection display is easily reduced, so that the aforementioned decrease in reflectance is easily reduced. For these reasons, in a liquid crystal display device of a comparatively large size (i.e. in which the pixels P are comparatively large in area), the configuration in which the pixel electrodes PE are provided above the common electrode CE is favorable.

Further, as already mentioned, the decrease in reflectance caused when regions in which pixel contact holes are formed do not contribute to a reflection display becomes greater as the pixels P become smaller in area (i.e. become higher in definition); therefore, in a liquid crystal display device of comparatively high definition (i.e. in which the pixels P are comparatively small in area), it is preferable that the common electrode CE be provided above the pixel electrodes PE.

Further, in the liquid crystal display device 100 of the present embodiment, a display is performed in a transverse electric field mode in which the liquid crystal layer 30 assumes twist alignment when no voltage is applied. More specifically, a display is performed in an FFS mode (referred to as a "TW-FFS mode") in which the liquid crystal layer 30 assumes twist alignment when no voltage is applied. This makes it possible to further improve the contrast ratio of a reflection display than in a case where a display is performed in a common FFS mode in which the liquid crystal layer 30 does not assume twist alignment (that is, the liquid crystal layer 30 has a twist angle of 0 degree) when no voltage is applied. It is preferable, from a point of view of improvement in contrast ratio, that the liquid crystal layer 30 have a twist angle larger than or equal to 45 degrees and smaller than or equal to 90 degrees when no voltage is applied.

Embodiment 2

Figure 8:
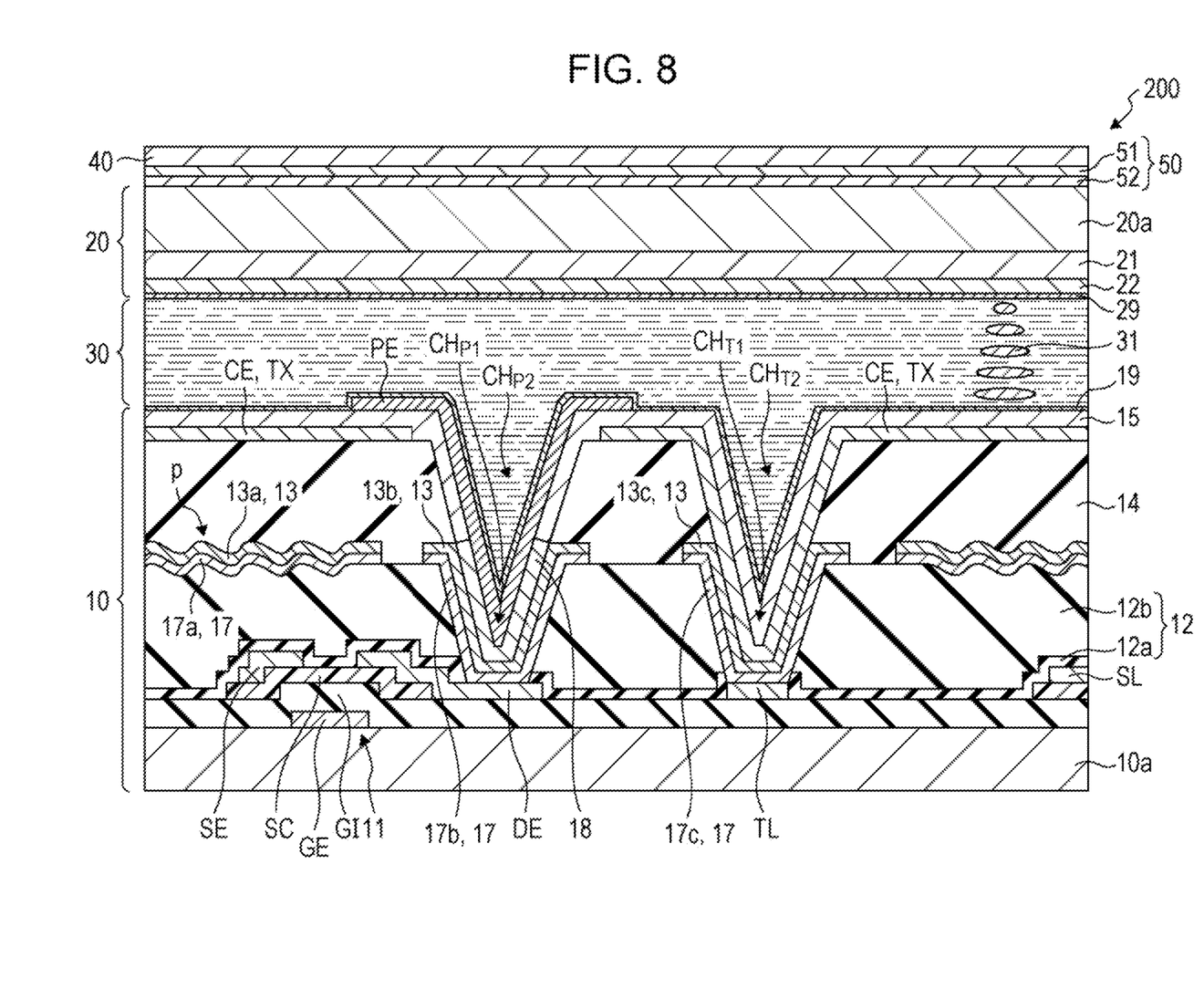
FIG. 8 is a cross-sectional view schematically showing a liquid crystal display device according to another embodiment of the present disclosure.

A liquid crystal display device 200 according to the present embodiment is described with reference to FIG. 8. FIG. 8 is a cross-sectional view schematically showing the liquid crystal display device 200. The following gives a description with a focus on points in which the liquid crystal display device 200 according to the present embodiment is different from the liquid crystal display device 100 of Embodiment 1.

The liquid crystal display device 200 of the present embodiment differs from the liquid crystal display device 100 of Embodiment 1 in that the semiconductor layer SC of each of the TFTs 11 is an oxide semiconductor layer. The oxide semiconductor layer can be formed, for example, from an In—Ga—Zn—O semiconductor.

In the configuration illustrated in FIG. 8, the TFT 11 has a bottom-gate structure. The gate electrode GE is provided on top of the substrate 10a, and the gate insulating layer GI is formed so as to cover the gate electrode GE. The semiconductor layer SC, which is an oxide semiconductor layer, is provided on top of the gate insulating layer GI. The source electrode SE and the drain electrode DE are provided on top of the semiconductor layer SC and on top of the gate insulating layer GI. In the configuration illustrated in FIG. 8, the first interlayer insulating layer 12 has a laminated structure including an inorganic insulating layer 12a and an organic insulating layer 12b formed on top of the inorganic insulating layer 12a.

Also in the liquid crystal display device 200 of the present embodiment, the touch lines TL are formed from the same conducting film as the source lines SL (i.e. at the same layer as the source lines SL). Therefore, the touch lines TL are provided at the gate insulating layer GI and located between the reflective layer 13 and the substrate 10a (i.e. opposite the liquid crystal layer 30 behind the reflective layer 13).

The liquid crystal display device 200 of the present embodiment too makes it possible to achieve simpler manufacturing processes and lower manufacturing costs than in a case where a configuration of a conventional in-cell touch panel is simply applied to a reflective liquid crystal display device.

Embodiment 3

A liquid crystal display device 300 according to the present embodiment is described with reference to FIG. 9.

Figure 9:
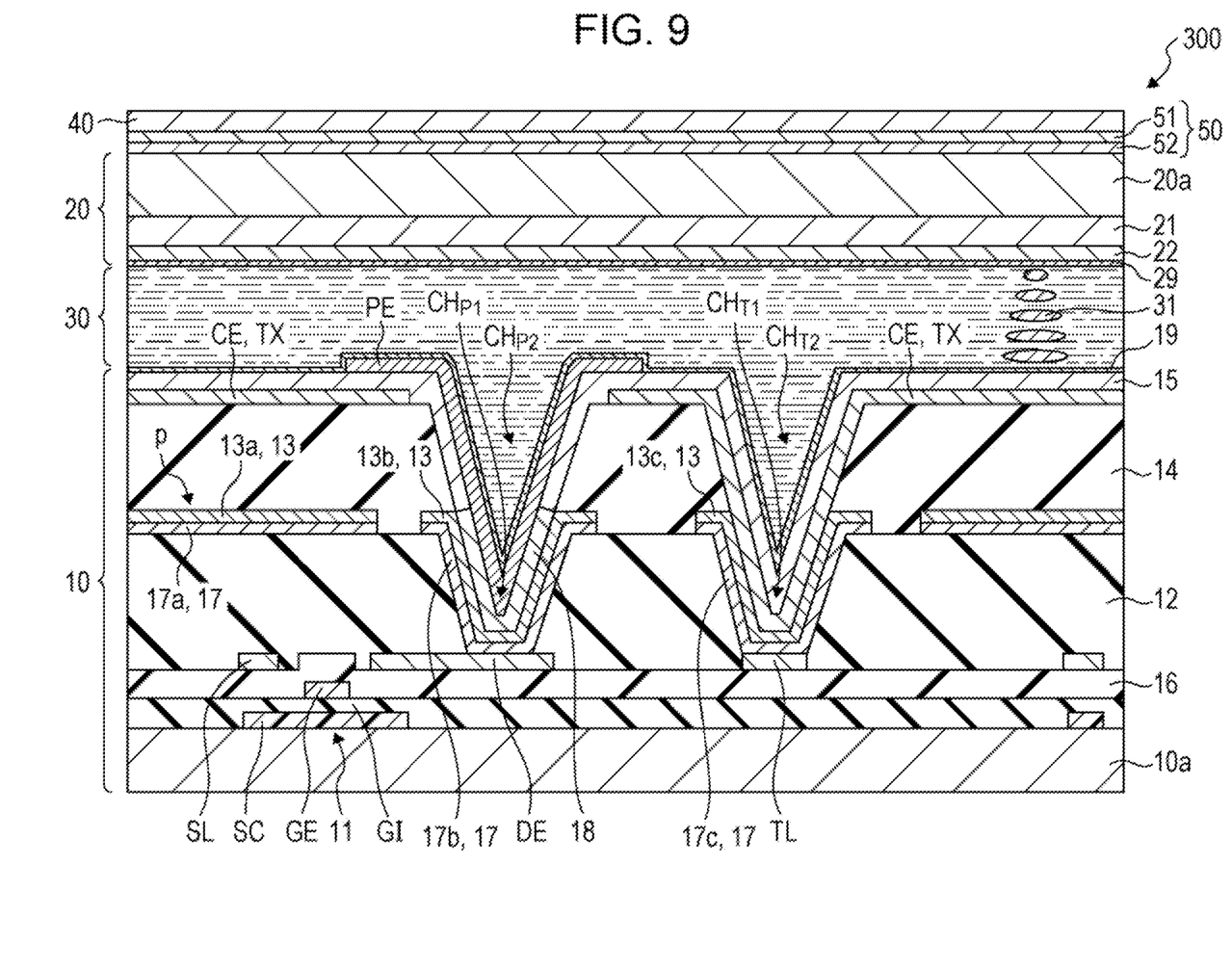
FIG. 9 is a cross-sectional view schematically showing a liquid crystal display device according to still another embodiment of the present disclosure.

FIG. 9 is a cross-sectional view schematically showing the liquid crystal display device 300. The following gives a description with a focus on points in which the liquid crystal display device 300 according to the present embodiment is different from the liquid crystal display device 100 of Embodiment 1.

The liquid crystal display device 300 of the present embodiment differs from the liquid crystal display device 100 of Embodiment 1 in that the first portion 13a of the reflective layer 13 does not have an uneven surface structure. In the liquid crystal display device 300, as shown in FIG. 9, the first interlayer insulating layer 12 does not have an uneven surface structure; therefore, the liquid crystal display device 300 does not have an uneven surface structure, either (i.e. has a substantially flat surface).

Also in the liquid crystal display device 300 of the present embodiment, the touch lines TL are formed from the same conducting film as the source lines SL (i.e. at the same layer as the source lines SL). This makes it possible to achieve simpler manufacturing processes and lower manufacturing costs.

The liquid crystal display device 300 of the present embodiment may further include a light scattering layer. By using a combination of the reflective layer 13 and the light scattering layer, a display that is close to paper white can be achieved. The light scattering layer can be, for example, a light scattering sheet placed on a side of the counter substrate 20 that faces the viewer.

Embodiment 4

Figure 10:
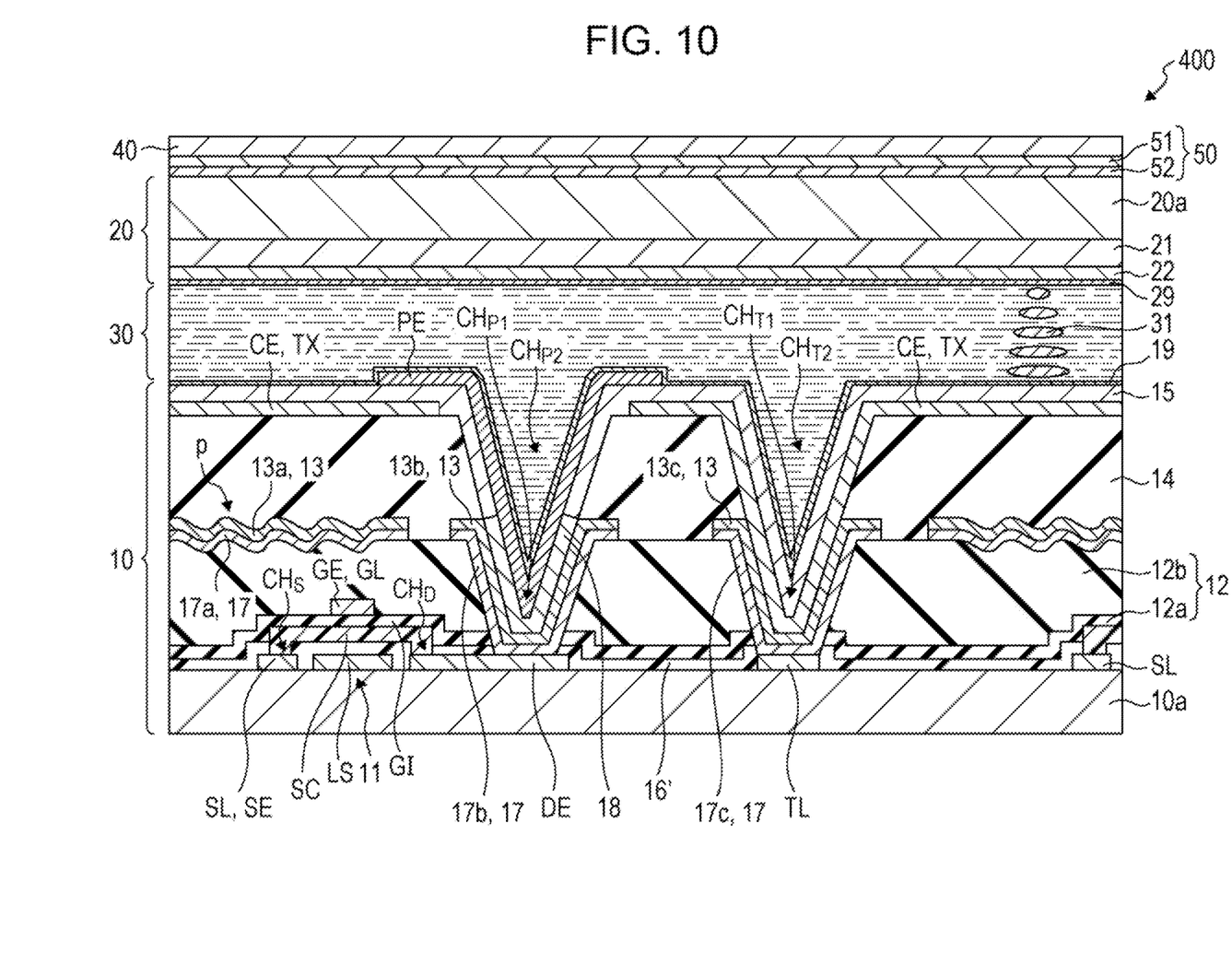
FIG. 10 is a cross-sectional view schematically showing a liquid crystal display device according to still another embodiment of the present disclosure.

A liquid crystal display device 400 according to the present embodiment is described with reference to FIG. 10. FIG. 10 is a cross-sectional view schematically showing the liquid crystal display device 400. The following gives a description with a focus on points in which the liquid crystal display device 400 according to the present embodiment is different from the liquid crystal display device 200 of Embodiment 2.

In the liquid crystal display device 200 of Embodiment 2, the source lines SL and the touch lines TL are located closer to the liquid crystal layer 30 than the gate lines GL. On the other hand, as will be described below, in the liquid crystal display device 400 of the present embodiment, the source lines SL and the touch lines TL are located closer to the substrate 10a than the gate lines GL.

As shown in FIG. 10, the TFT substrate 10 of the liquid crystal display device 400 further includes a light-shielding layer LS. The light-shielding layer LS is provided on top of the substrate 10a. The source lines SL and the source electrode SE and drain electrode DE of each of the TFTs 11 are formed from the same conducting film as the light-shielding layer LS (i.e. at the same layer as the light-shielding layer LS).

A lower insulating layer 16' is formed so as to cover the light-shielding layer LS or other components. The semiconductor layer SC, which is an oxide semiconductor layer, is provided on top of the lower insulating layer 16'. The light-shielding layer LS faces at least a channel region of the semiconductor layer SC across the lower insulating layer 16'. The semiconductor layer SC is electrically connected to the source electrode SE and the drain electrode DE in a source contact hole $CH_S$ and a drain contact hole $CH_D$, respectively, formed in the lower insulating layer 16'.

The gate insulating layer GI is formed so as to cover the semiconductor layer SC, and the gate electrode GE and the gate line GL are provided on top of the gate insulating layer GI. The gate electrode GE faces the channel region of the semiconductor layer SC across the gate insulating layer GI. The first pixel contact hole $CH_{P1}$ is formed across the first interlayer insulating layer 12, the gate insulating layer GI, and the lower insulating layer 16'.

Also in the liquid crystal display device 400 of the present embodiment, the touch lines TL are formed from the same conducting film as the source lines SL (i.e. at the same layer as the source lines SL). Therefore, the touch lines TL are covered with the lower insulating layer 16', and the first touch contact hole $CH_{T1}$ is formed across the first interlayer insulating layer 12, the gate insulating layer GI, and the lower insulating layer 16'.

A common top-gate oxide semiconductor TFT is usually configured such that a gate electrode is placed on top of part of an oxide semiconductor layer with a gate insulating layer sandwiched therebetween and a source electrode, a drain electrode, and a source line are placed on top of an insulating layer covering the gate electrode. That is, a source metal layer including the source lines or other components is located above a gate metal layer including the gate electrode. Such a configuration is called an "upper source structure" here.

On the other hand, in the TFT substrate 10 of the liquid crystal display device 400, the source metal layer is located below (i.e. closer to the substrate 10a than) the gate metal layer. Such a configuration is called a "lower source structure" here.

Also in the liquid crystal display device 400 of the present embodiment, in which the lower source structure is adopted, the touch lines TL are formed from the same conducting film as the source lines SL (i.e. at the same layer as the source lines SL). This makes it possible to achieve simpler manufacturing processes and lower manufacturing costs.

Oxide Semiconductor TFT

As a TFT 11 to be provided in each pixel P, an oxide semiconductor TFT can be suitably used as illustrated in the liquid crystal display device 200 of Embodiment 2 and the liquid crystal display device 400 of Embodiment 4. In the oxide semiconductor TFT, an oxide semiconductor is used as a material of an active layer. That is, the oxide semiconductor TFT includes an oxide semiconductor layer as the active layer. The oxide semiconductor is a material that has recently drawn attention as an active layer material that replaces amorphous silicon and polycrystalline silicon.

The oxide semiconductor is higher in mobility than amorphous silicon. For this reason, the oxide semiconductor TFT can operate at higher speed than can an amorphous silicon. Further, the oxide semiconductor layer can also be applied to a large-area device, as the oxide semiconductor is formed by a simpler process than is a polycrystalline silicon layer.

Furthermore, since the oxide semiconductor TFT is superior in off-leak characteristic, it is also possible to utilize a driving scheme of performing a display with a reduction in the frequency of refreshing of an image. For example, when a still image is displayed, an operation can be performed such that image data is refreshed once a second. Such a driving scheme is called "intermittent driving" or "low-frequency driving" and makes it possible to achieve a drastic cut in the amount of electricity that is consumed by a liquid crystal display device.

Adopting intermittent driving to perform touch detection in a period during which the image is not refreshed makes it possible to reduce deterioration in sensitivity of a touch operation due to noise from a driving circuit and make the S/N ratio (signal-to-noise ratio) approximately ten times higher than has conventionally been the case.

Further, since the oxide semiconductor TFT is also favorable to reduction in TFT size, it is also possible to suitably achieve a configuration (called "memory-in-pixel (MIP)") in which a memory circuit is provided for each pixel P. A specific MIP configuration is not described here, as it is publicly known.

The oxide semiconductor contained in the active layer (oxide semiconductor layer) of the oxide semiconductor TFT may be an amorphous oxide semiconductor or may be a crystalline oxide semiconductor having a crystalline portion. Examples of the crystalline oxide semiconductor include a polycrystalline oxide semiconductor, a microcrystalline oxide semiconductor, and a crystalline oxide semiconductor whose c axis is aligned substantially perpendicularly to a layer surface.

The oxide semiconductor layer may have a laminated structure of two or more layers. An oxide semiconductor layer having a laminated structure may include an amorphous oxide semiconductor layer and a crystalline oxide semiconductor layer or may include a plurality of crystalline oxide semiconductor layers of different crystal structures. Further, an oxide semiconductor layer having a laminated structure may include a plurality of amorphous oxide semiconductor layers. In a case where the oxide semiconductor layer has a two-layer structure including an upper layer and a lower layer, the energy gap of an oxide semiconductor contained in the lower layer and the energy gap of an oxide semiconductor contained in the upper layer may be different from each other.

An amorphous oxide semiconductor, a material of, a structure of, and a method for forming each of the aforementioned crystalline oxide semiconductors, a configuration of an oxide semiconductor layer having a laminated structure, or other features are disclosed, for example, in Japanese Unexamined Patent Application Publication No. 2014-007399, the entire contents of which are hereby incorporated by reference.

The oxide semiconductor layer may contain at least one of metallic elements In, Ga, and Zn. In the present embodiment, the oxide semiconductor layer contains an In—Ga—Zn—O semiconductor (e.g. indium-gallium-zinc oxide). The In—Ga—Zn—O semiconductor here is a ternary oxide of In (indium), Ga (gallium), and Zn (zinc), and the proportions (composition ratios) of In, Ga, and Zn are not limited to particular values. Examples of the proportions include In:Ga:Zn=2:2:1, In:Ga:Zn=1:1:1, and In:Ga:Zn=1:1:2. Such an oxide semiconductor layer can be formed from an oxide semiconductor film containing the In—Ga—Zn—O semiconductor.

The In—Ga—Zn—O semiconductor may be amorphous or may be crystalline. As a crystalline In—Ga—Zn—O semiconductor, a crystalline In—Ga—Zn—O semiconductor whose c axis is aligned substantially perpendicularly to a layer surface is preferable.

A crystal structure of a crystalline In—Ga—Zn—O semiconductor is disclosed, for example, in the aforementioned Japanese Unexamined Patent Application Publication No. 2014-007399, Japanese Unexamined Patent Application Publication No. 2012-134475, and Japanese Unexamined Patent Application Publication No. 2014-209727, the entire contents of which are hereby incorporated by reference. A TFT having an In—Ga—Zn—O semiconductor layer has high mobility (more than twenty times higher than the mobility of an a-Si TFT) and a low leak current (less than one-hundredth the leak current of an a-Si TFT) and can therefore be suitably used as a driving TFT (TFT that is included in a driving circuit provided, for example, near a display region including a plurality of pixels and on the same substrate as the display region) and a pixel TFT (TFT that is provided in a pixel).

The oxide semiconductor layer may contain another oxide semiconductor instead of the In—Ga—Zn—O semiconductor. For example, the oxide semiconductor layer may contain an In—Sn—Zn—O semiconductor (e.g. $In_2O_3$—$SnO_2$—ZnO; InSnZnO). The In—Sn—Zn—O semiconductor is a ternary oxide of In (indium), Sn (tin), and Zn (zinc). Alternatively, the oxide semiconductor layer may contain an In—Al—Zn—O semiconductor, an In—Al—Sn—Zn—O semiconductor, a Zn—O semiconductor, an In—Zn—O semiconductor, a Zn—Ti—O semiconductor, a Cd—Ge—O semiconductor, a Cd—Pb—O semiconductor, CdO (oxide cadmium), a Mg—Zn—O semiconductor, an In—Ga—Sn—O semiconductor, an In—Ga—O semiconductor, a Zr—In—Zn—O semiconductor, a Hf—In—Zn—O semiconductor, an Al—Ga—Zn—O semiconductor, a Ga—Zn—O semiconductor, an In—Ga—Zn—Sn—O semiconductor, or other semiconductors.

Transflective Liquid Crystal Display Device

While the reflective liquid crystal display devices 100, 200, 300, and 400 have been described so far, a liquid crystal display device according to an embodiment of the present disclosure may be a transflective liquid crystal display device. A configuration of a transflective liquid crystal display device 500 is described with reference to FIG. 11.

Figure 11:
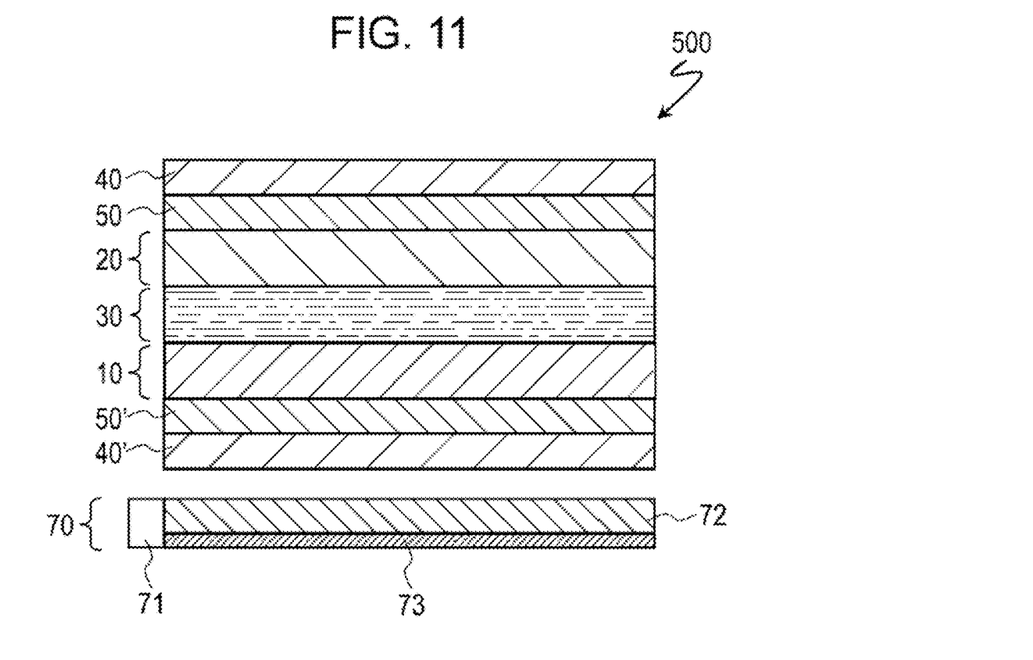
FIG. 11 is a cross-sectional view schematically showing a liquid crystal display device according to still another embodiment of the present disclosure.

The liquid crystal display device 500 differs from the liquid crystal display devices 100, 200, 300, and 400 in that the liquid crystal display device 500 includes a further polarizing plate 40', a further phase difference layer 50', and a lighting device (backlight) 70.

The polarizing plate 40' is placed further backward than the liquid crystal layer 30. More specifically, the polarizing plate 40' is placed further backward than the TFT substrate 10.

The phase difference layer 50' is placed between the polarizing plate 40' and the liquid crystal layer 30. More specifically, the phase difference layer 50' is placed between the polarizing plate 40' and the TFT substrate 10. The phase difference layer 50' can include a half-wavelength plate and a quarter-wavelength plate.

The lighting device 70 is placed at the back of the polarizing plate 40' (i.e. at the back of the TFT substrate 10). In the illustrated example, the lighting device 70 includes a light source (e.g. an LED) 71 that emits light, a light guide plate 72 that guides the light from the light source 71 toward the polarizing plate 40', and a reflective plate 73 placed on the back of the light guide plate 72. The lighting device 70 may further include a prism sheet and a diffusion sheet placed on the front (or back) of the light guide plate 72.

Figure 12:
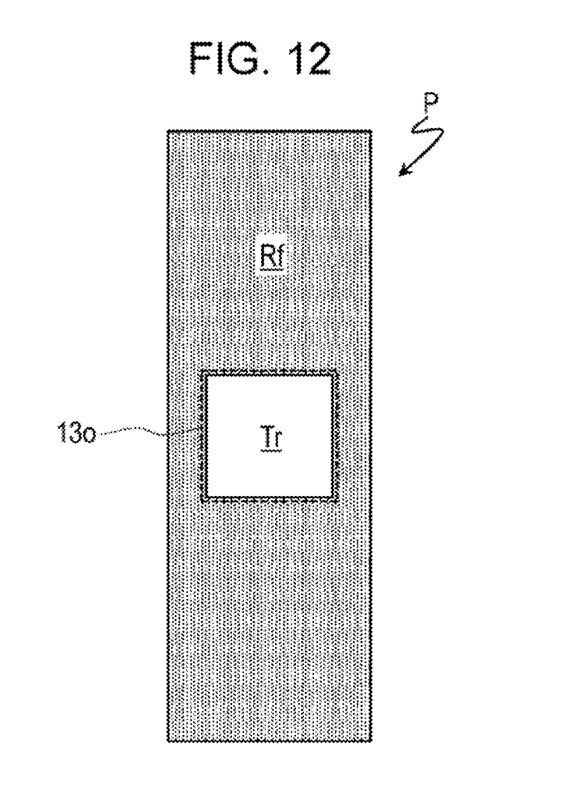
FIG. 12 is a diagram showing a reflective region and a transmissive region that each pixel of the liquid crystal display device includes.

As shown in FIG. 12, each pixel P of the liquid crystal display device 500 includes a reflective region Rf in which to perform a display in a reflective mode and a transmissive region Tr in which to perform a display in a transmissive mode. The reflective layer 13 of the TFT substrate 10 has an opening 130 formed in the transmissive region Tr. The proportion of the area of the transmissive region Tr to the area of the pixel P can be set as appropriate depending, for example, on the intended use and ranges, for example, from 20% to 90%. Further, the position and shape of the transmissive region Tr in the pixel P can also be set as appropriate depending, for example, on the intended use.

An embodiment of the present disclosure makes it possible to provide a liquid crystal display device that is capable of a reflective mode of display and that can be suitably used as an in-cell touch panel. An embodiment of the present disclosure is suitably used in reflective and transflective liquid crystal display devices.

The present disclosure contains subject matter related to that disclosed in Japanese Priority Patent Application JP 2023-145981 filed in the Japan Patent Office on Sep. 8, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
   a first substrate;
   a second substrate placed closer to a viewer than the first substrate; and
   a liquid crystal layer provided between the first substrate and the second substrate,
   the liquid crystal display device having a plurality of pixels arranged in a matrix including a plurality of rows and a plurality of columns,
   wherein
   each of the plurality of pixels includes a reflective region in which to perform a display in a reflective mode,
   the first substrate includes
      a substrate,
      a plurality of gate lines extending in a row-wise direction,
      a plurality of source lines extending in a column-wise direction,
      a plurality of thin-film transistors provided separately in correspondence with each of the plurality of pixels,
      a plurality of pixel electrodes each electrically connected to a corresponding one of the plurality of thin-film transistors, and
      a reflective layer formed from an electrical conducting material, located within at least the reflective region, and provided between the pixel electrodes and the substrate,
   the first substrate further includes
      a plurality of touch sensor electrodes to which different signals are applied, and
      a plurality of touch lines each electrically connected to a corresponding one of the plurality of touch sensor electrodes, and
   the plurality of touch lines are formed from a conducting film that is identical to that from which the plurality of source lines are formed, and are provided between the reflective layer and the substrate.

2. The liquid crystal display device according to claim 1, wherein each of the plurality of touch lines is placed between ones of the plurality of source lines that are adjacent to each other.

3. The liquid crystal display device according to claim 1, wherein
   the first substrate has a first horizontal alignment film in contact with the liquid crystal layer,
   the second substrate has a second horizontal alignment film in contact with the liquid crystal layer, and
   the liquid crystal layer assumes twist alignment when no voltage is applied.

4. The liquid crystal display device according to claim 3, wherein the liquid crystal layer has a twist angle larger than or equal to 45 degrees and smaller than or equal to 90 degrees when no voltage is applied.

5. The liquid crystal display device according to claim 1, wherein the reflective layer includes a portion electrically connecting any one of the plurality of touch sensor electrodes and one of the plurality of touch lines that corresponds to the one touch sensor electrode.

6. The liquid crystal display device according to claim 1, wherein at least part of the reflective layer has an uneven surface structure.

7. The liquid crystal display device according to claim 1, wherein the first substrate further includes a first interlayer insulating layer provided between the reflective layer and the thin-film transistors and a second interlayer insulating layer provided between the pixel electrodes and the reflective layer.

8. The liquid crystal display device according to claim 1, wherein
   the first substrate further includes a common electrode provided to face the pixel electrodes across a dielectric layer,
   the common electrode is divided into a plurality of segments that function as the plurality of touch sensor electrodes, and
   at least either each of the pixel electrodes or the common electrode includes at least one slit.

9. The liquid crystal display device according to claim 1, wherein the plurality of source lines and the plurality of touch lines are located closer to the liquid crystal layer than the plurality of gate lines.

10. The liquid crystal display device according to claim 1, wherein the plurality of source lines and the plurality of touch lines are located closer to the substrate than the plurality of gate lines.

11. The liquid crystal display device according to claim 1, wherein
   each of the plurality of pixels includes a transmissive region in which to perform a display in a transmissive mode, and
   the reflective layer has an opening formed in the transmissive region.

* * * * *